No. 742,345. PATENTED OCT. 27, 1903.
O. A. MYGATT.
METHOD OF MAKING GLASS REFLECTORS.
APPLICATION FILED MAY 21, 1903.
NO MODEL.

WITNESSES:
Chas. K. Davies.
M. E. Brown.

INVENTOR
O. A. Mygatt
BY W. H. Bartlett
Attorney

No. 742,345. Patented October 27, 1903.

UNITED STATES PATENT OFFICE.

OTIS A. MYGATT, OF NEW YORK, N. Y.

METHOD OF MAKING GLASS REFLECTORS.

SPECIFICATION forming part of Letters Patent No. 742,345, dated October 27, 1903.

Application filed May 21, 1903. Serial No. 158,156. (No model.)

*To all whom it may concern:*

Be it known that I, OTIS A. MYGATT, a citizen of the United States, residing at New York, in the county of New York and State of New York, have invented certain new and useful Improvements in Methods of Making Glass Reflectors, of which the following is a specification.

This invention relates to a method of making glass reflectors for lamps, being a modification of the usual method of making pressed-glass shades.

The object of the invention is to produce glass reflectors having their bodies pressed to exact size and shape in a mold and with thin necks or collars, which are less susceptible to breakage by changes of temperature than the usual reflectors, and also to be able to make from the same mold pressed reflectors having drawn necks or collars of various sizes to fit different kinds of holders.

The invention consists in the several steps or manipulations hereinafter described.

The figures of drawings are intended to illustrate various mechanisms used and to show shades at different stages of construction.

Figure 1:
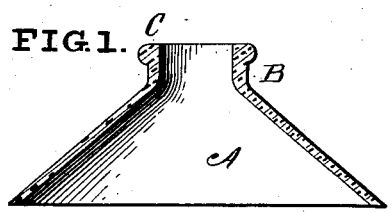
Figure 3:
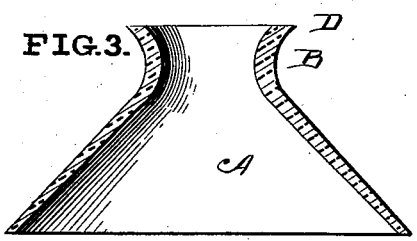
Figure 2:
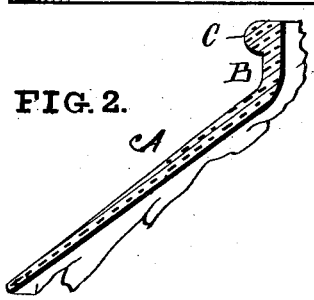
Figure 4:
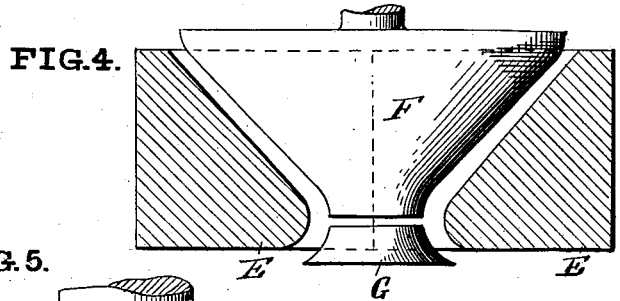
Figure 5:
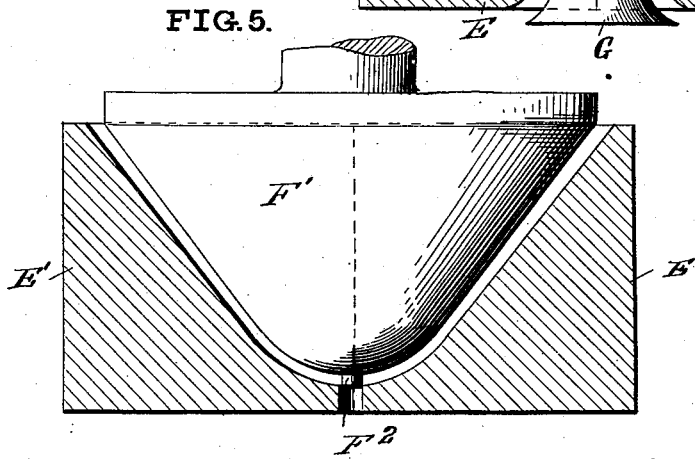
Figure 6:
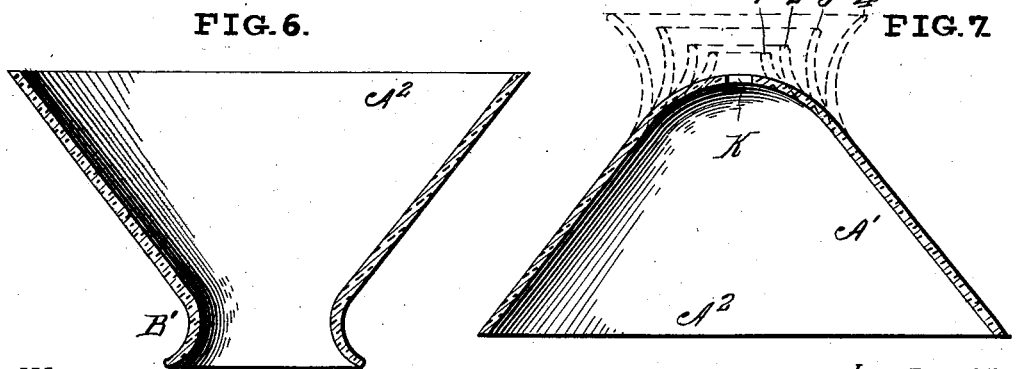
Figure 7:
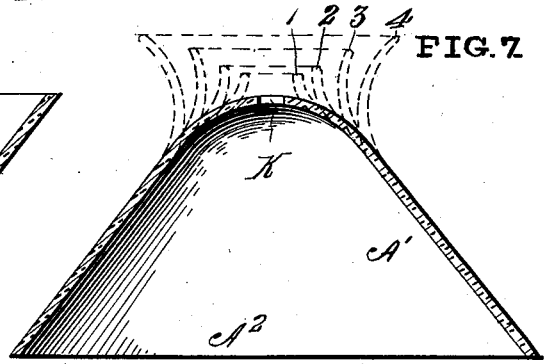

Figure 1 is a vertical central section of a reflector pressed in a mold by the old and well-known process. Fig. 2 is a broken section, and Fig. 3 a modification of old forms of pressed-glass reflectors. Fig. 4 is a section of the mold in which the molded shape of Fig. 3 has heretofore been made. Fig. 5 is a vertical section of a mold according to my present invention. Fig. 6 is a section of a reflector produced by the present process, and Fig. 7 shows in full lines the article as it comes from the press and in dotted lines various forms assumed under the tooling or drawing process to be described.

Heretofore pressed-glass reflectors for electric-lamp and other fixtures have generally been pressed in a mold to the form necessary to fit the fixture. Fig. 1 shows such a reflector, and Fig. 2 shows a broken section thereof. The body A of the reflector varies somewhat in form in different constructions; but in nearly all such reflectors the neck B is thicker than the body, and a ring or collar C is added to form a means for attachment to the holder. Where the collar or bead C is omitted, the neck is flared outwardly, as at D, Fig. 3. The thickening of the neck B will be understood from the sectional view, Fig. 4, in which E E indicate the mold, and F G the plungers by which the glass is pressed from a plastic mass introduced between said plungers. As heated glass is of a waxy nature and not a fluid, it resists pressure in the mold and is apt to be thickest near the locality of initial pressure, not flowing readily to the extreme edge of the mold. As the neck B is likely to be the part most exposed to heat, this part should be thinnest instead of thickest, for thin glass is less likely to break under change of temperature. As will be understood, a separate mold is required for each size of molded neck and collar where the reflector is molded to its ultimate shape.

At Fig. 5 I show a form of mold and plunger by which a part of my improved method is carried out. E' E' indicate the mold-sections, and F' denotes the plunger. A mass of plastic glass introduced into this mold will be pressed into the form of the body A', (shown in full lines in Fig. 7,) the projection $F^2$ on the plunger forming the small opening K in the end of the reflector A'.

As soon as the body A' of the reflector is stamped to shape the end having the opening K is placed in the glory-hole of a glass-furnace and heated. The reflector is held by suitable instruments at the edge $A^2$, and the heated end is stretched or tooled out to shape. The dotted lines 1 2 3 4 show the forms the neck of the reflector may assume at different stages of the drawing. This spreading of the neck also thins the same, as the glass must run thinner in order to surround a larger space. The neck B' of Fig. 6 differs from the neck B of Fig. 1 in that the former is much thinner. The neck B' of Fig. 6 may be formed of a size to fit the desired holder, and thus from the same mold a number of reflectors may be made, the bodies being alike and the collars being of different sizes, so as to be applicable to the various common forms of fixtures or holders. The collar B' is turned out to flare in reverse direction from the flare of body A', and the bead on the edge is usually avoided.

It is common in blown-glass shades to form the collars to various sizes; but so far as I am aware it is new to press the body of a glass reflector to its ultimate form and size in a glass press or mold and afterward by heating the open neck only of the reflector to draw that part out thin and at the same time adapt it to fit a holder or fixture of any size, and it is, I believe, new to make pressed-glass reflectors adapted to different holders from the same mold.

The heating and drawing of the neck of the reflector seem to toughen it, so that it is capable of resisting all usual strains. The article is not only lighter but stronger than the common pressed-glass reflector.

What I claim is—

1. The method of making glass reflectors, which consists in pressing the body of the reflector to shape in a mold, leaving the small end open and thicker than ultimately required, then reheating the small open end and drawing the same out to the desired diameter and to reduced thickness.

2. The method of making glass reflectors which consists in pressing the body to ultimate form but with a small open neck, then reheating the neck and thinning the same out and curving it into a reverse taper from that of the body.

In testimony whereof I affix my signature in presence of two witnesses.

OTIS A. MYGATT.

Witnesses:
W. A. DOREY,
H. E. NASON.